Dec. 22, 1925.  1,566,640
J. B. BEAUDRY
RAIL JOINT NUT LOCK
Filed Oct. 27, 1925
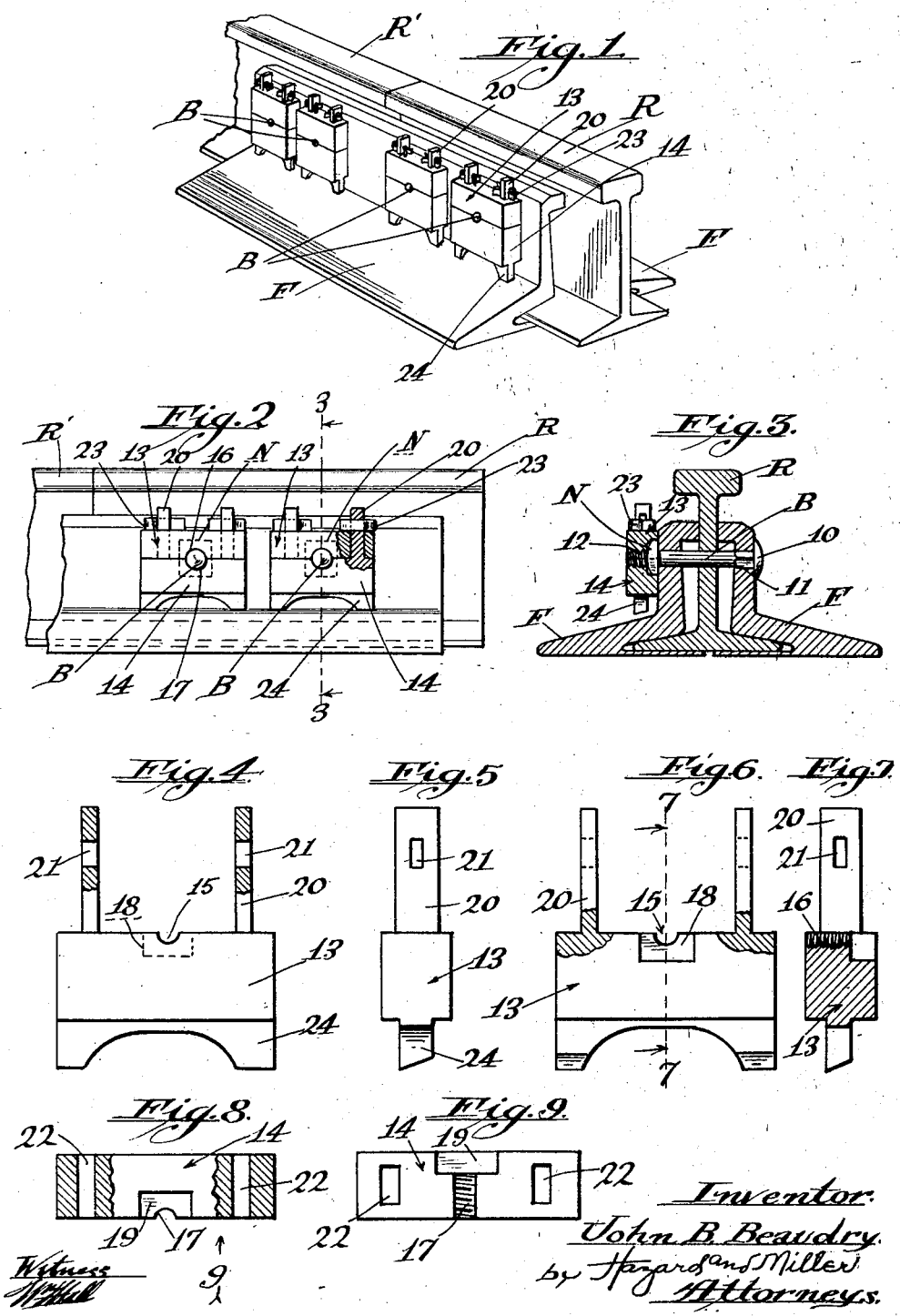
Inventor:
John B. Beaudry
by Hazard and Miller
Attorneys Patented Dec. 22, 1925.

1,566,640

UNITED STATES PATENT OFFICE.

JOHN B. BEAUDRY, OF LOS ANGELES, CALIFORNIA.

RAIL-JOINT NUT LOCK.

Application filed October 27, 1925. Serial No. 65,105.

*To all whom it may concern:*

Be it known that I, JOHN B. BEAUDRY, a citizen of the United States, residing at Los Angeles, in the county of Los Angeles and State of California, have invented new and useful Improvements in Rail-Joint Nut Locks, of which the following is a specification.

This invention relates to improvements in nut locks for preventing the loosening of nuts on the bolts in rail joints.

The primary object of the invention is to provide a device which can be applied directly to the nut and bolt on any of the conventional rail joints now in use and which will effectively prevent loosening of the nut on the bolt and thus prevent loosening of the rail joint.

A further object of the invention is to provide a device which can be easily, quickly and cheaply constructed, and which can be easily and quickly applied to the nut on the bolt of a rail joint so as to prevent loosening of the nut and at the same time is capable of being easily detached if desired for any reason.

With the foregoing and other objects in view which will be made manifest in the following detailed description and specifically pointed out in the appended claims, reference is had to the accompanying drawings for an illustrative embodiment of the invention, wherein:

Figure 1 is a perspective view of a rail joint to which the improved nut lock has been applied, Fig. 2 is a side elevation of a portion of the rail joint shown in Fig. 1, parts being broken away and shown in vertical section, Fig. 3 is a sectional view taken on the line 3—3 of Fig. 2, Fig. 4 is a side elevation, parts being broken away and shown in section, of the bottom part of the bottom block of the nut lock, Fig. 5 is an end elevation of the part shown in Fig. 4, Fig. 6 is a side elevation, parts being shown in section of the part shown in Fig. 4 but taken from the reverse side from that shown in Fig. 4, Fig. 7 is a vertical section taken on the line 7—7 of Fig. 6 in the direction indicated, Fig. 8 is a view in elevation, portions being shown in section, of the upper part or upper block of the nut lock taken upon that side which is positioned against the fish plate, and Fig. 9 is a bottom plan view of the upper block and may be considered as taken in the direction of the arrow 9 upon Fig. 8.

Referring to the accompanying drawings wherein similar reference characters designate similar parts throughout, the adjacent rail ends are indicated at R and R', which have fish plates or side plates F of any conventional construction positioned against their sides. Bolts B extend through the fish plates F and through the webs of the rail ends R and R', thus securing the fish plates to the rail ends and fastening the rail ends to each other. The conventional bolts employed have heads 10 adjacent which are squared portions 11 which fit in squared apertures in one of the fish plates. The nuts N are usually squared and are screwed onto the threaded portions or threaded ends 12 of the bolts B. The usual construction is to place a split lock washer beneath each of the nuts N, so that when the nut is tightened, it is intended that these lock washers keep it from loosening. In actual practice, however, it is noted that the natural resiliency or spring of the lock washers decreased in the course of time, and it frequently occurs that the nuts do loosen so that it is necessary to keep track walkers who continually inspect and tighten these nuts. In the use of the improved lock nut these lock washers heretofore employed are omitted, and the nuts N are tightened directly against the face of one of the fish plates F, or if found desirable, a conventional washer can be positioned between the nut N and the fish plate. However, the washer is preferably omitted, so that the threaded end portion 12 of each of the bolts B, which projects through and beyond the nut N, will be of sufficient length to permit the application of the improved nut lock.

The improved nut lock consists of lower and upper parts or blocks 13 and 14, which parts are adapted to be secured about the threaded end portion 12 of each of the bolts B. On the upper face of the lower block 13 there is formed a recess 15 which is semi-cylindrical in form and which is threaded as indicated by threads 16 upon Fig. 7. In a similar manner on the under side of the upper block 14 there is formed a semi-cylindrical recess 17 which is also threaded. When the two blocks are positioned together, these threaded recesses 15 and 17 cooperate to form a threaded aperture having threads complementary to the threads on the bolts B. On the side faces of the lower and upper blocks 13 and 14, which are positioned against the fish plate F, there are formed rectangular recesses indicated at 18 and 19 respectively, which recesses cooperate, when the blocks are positioned together, to form a squared socket for the reception of the nut N. The lower block 13 is provided with upstanding pins 20 having slots or apertures 21 therethrough and the upper block 14 has apertures 22 formed vertically therein capable of receiving the vertical pins 20. When the upper block is caused to slide down on the pins 20 so that its lower face contacts with the upper face of the lower block, cotter pins or equivalent fastening devices such as are indicated at 23 are passed through the apertures 21 and serve to lock the two parts or blocks 13 and 14 together. On the bottom of the lower block 13 there are preferably formed suitable legs 24 which are of such a length that when the two blocks are applied to the bolt B, they will be disposed adjacent the base of the fish plate F. As clearly illustrated upon Fig. 3, the legs 24 do not actually engage the base of the fish plate, leaving a small amount of clearance to permit the lower block to be easily applied. The purpose of these legs is to engage the base of the fish plate F if the nut lock tends to rotate upon the bolt B.

The application of the nut lock is as follows: The bolt B is first inserted through the fish plate and the nut N, and the nut N is tightened and then is arranged so that two of its sides are vertical. The lower block 13 is then moved toward the upright portion of the fish plate in an inclined manner so that it is upwardly inclined toward the upright portion of the fish plate. When it engages the fish plate, its recess 18 will receive the lower half of the nut N and the threaded recess 15 will receive the lower half of the threaded portion 12 of the bolt B. The bottom of the lower block is then pressed against the upright portion of the fish plate, so that it assumes the position as shown in Fig. 3. The upper block 14 is then applied to the pins 20 and caused to slide downwardly thereon so that its recess 19 receives the upper half of the nut N and its threaded recess 17 receives the upper half of the threaded portion 12 of the bolt B. By a slight manipulation or adjustment the threads in the recesses 15 and 17 can be caused to fit or mesh with the threads on the bolts. When this is accomplished, the apertures 21 will be completely uncovered, and the cotter pins 23, which fit the apertures rather closely, can then be inserted. It will be noted that by this construction when the two blocks are applied, they cannot be pulled axially off of the end of the bolt because of the threaded engagement with the threads on the bolt. Furthermore, rotation of the two blocks which would produce an unscrewing relatively to the bolt is prevented because of the legs 24. Lastly, rotation of the two blocks relatively to the nut N is prevented because of the engagement between the sides of the recesses 18 and 19 and the sides of the nut N.

From the above described construction it will be readily appreciated that the improved nut lock can be easily and quickly applied to the rail joint so that the nuts N will be permanently held in place. At the same time the nut lock can be removed very easily by withdrawing the cotter pins. It will be noted that the improved nut lock is very easy to manufacture as both of the blocks can be cast into their shapes, the only machine work which is necessary being the machining of the threads in the two recesses 15 and 17. In some instances even these threads may be formed when the blocks are cast.

It will be understood that various changes may be made in the detail of construction without departing from the spirit or scope of the invention as defined by the appended claims.

I claim:

1. In a rail joint wherein there are fish plates arranged along the sides of adjacent rail ends, bolts extending through the fish plates and rail ends, and nuts threaded onto the bolts, a lock for each nut comprising two parts adapted to be secured together about the end of each bolt, said parts having threaded recesses formed thereon, adapted to cooperate to form an aperture which is threaded complementarily to the threads on the bolt, one of said parts being so constructed as to be engageable upon the base of the fish plate to prevent its rotation relatively to the bolt, and means associated with said parts engageable upon the nut on the bolt for preventing relative rotation between the nut and said parts.

2. A device for preventing the loosening of nuts upon bolts of rail joints comprising two blocks, means for securing said blocks together about the end of a bolt, said blocks having threaded recesses formed thereon, adapted to cooperate to form a threaded aperture which is threaded complementarily to the threads on the bolt, means carried by one of said blocks engageable upon a portion of a fish plate for preventing rotation of said blocks relatively to the bolt, and means associated with said parts engageable with the nut on the bolt for preventing rotation of the nut relatively to said blocks.

3. A device for preventing the loosening of nuts upon bolts in rail joints comprising two blocks adapted to be secured about the end of the bolt, said blocks having threaded recesses formed thereon adapted to cooperate to form a threaded aperture which is threaded complementarily to the threads on the bolts, there being other recesses formed on the sides of said blocks adapted to cooperate to form a socket which will receive the nut on the bolt, and means for securing said blocks together, one of said blocks being so constructed that its rotation upon the bolt will be prevented.

4. A device for preventing the loosening of nuts upon bolts in rail joints comprising two blocks adapted to be secured about the end of the bolt, said blocks having threaded recesses formed thereon adapted to cooperate to form a threaded aperture which is threaded complementarily to the threads on the bolts, there being other recesses formed on the sides of said blocks adapted to cooperate to form a socket which will receive the nut on the bolt, pins carried by one of said blocks, there being apertures in the other block capable of receiving said pins, and means engageable upon said pins for preventing separation of said blocks, one of said blocks being so constructed that its rotation relatively to the bolt will be prevented.

5. A device for preventing the loosening of nuts upon bolts in rail joints comprising two blocks adapted to be secured about the end of the bolt, said blocks having threaded recesses formed thereon adapted to cooperate to form a threaded aperture which is threaded complementarily to the threads on the bolts, there being other recesses formed on the sides of said blocks adapted to cooperate to form a socket which will receive the nut on the bolt, pins carried by one of said blocks, there being apertures in the other block capable of receiving said pins and apertures in said pins, cotter pins receivable in the apertures, thus fastening said blocks together, and means for preventing rotation of said blocks relatively to the bolt on which they are mounted.

In testimony whereof I have signed my name to this specification.

JOHN B. BEAUDRY.